United States Patent [19]

Huber et al.

[11] Patent Number: 5,960,934

[45] Date of Patent: Oct. 5, 1999

[54] ROLLER DRIVE UNIT

[75] Inventors: Thomas Huber, Iffeldorf; Richard Holzner, Dorfen, both of Germany

[73] Assignee: Telair International GmbH, Hausham, Germany

[21] Appl. No.: 09/053,326

[22] Filed: Apr. 1, 1998

[30] Foreign Application Priority Data

Apr. 11, 1997 [DE] Germany .......................... 197 15 180
May 6, 1997 [DE] Germany .......................... 197 19 160

[51] Int. Cl.[6] .................................................. B65G 13/02
[52] U.S. Cl. ........................................................ 198/782
[58] Field of Search ................................ 198/780, 782, 198/791

[56] References Cited

U.S. PATENT DOCUMENTS

| 3,690,440 | 9/1972 | Macpherson | 198/782 |
| 3,737,022 | 6/1973 | DeNeefe et al. | 198/782 |
| 3,899,070 | 8/1975 | Lang | 198/782 |
| 5,351,808 | 10/1994 | Sundseth | 198/782 |
| 5,660,268 | 8/1997 | Paauwe et al. | 198/782 |

FOREIGN PATENT DOCUMENTS

| 355251A1 | 2/1989 | European Pat. Off. |
| OS1956946 | 11/1970 | Germany . |
| 4102424A1 | 7/1992 | Germany . |

Primary Examiner—James R. Bidwell
Attorney, Agent, or Firm—Howard & Howard

[57] ABSTRACT

A roller drive unit to propel objects, in particular cargo containers, on a conveyor track is proposed, which comprises an electric motor (20) to rotate a drive roller (30). The drive roller (30) extends substantially across the entire width of a frame (10) of the roller drive unit and is subdivided in the middle to form two drive-roller components (31, 32). The two drive-roller components (31, 32) are rotatably mounted on the frame (10) in a bearing (33) in the middle of the drive roller. The roller drive unit comprises a lifting mechanism (41, 42) comprising paired components disposed symmetrically about the middle of the drive roller (30) and about the bearing (33). As a result of this symmetrical arrangement of the drive roller (30) and the lifting mechanism (41, 42), a good load distribution and a stable retention of the drive roller (30) in its raised position are achieved.

6 Claims, 3 Drawing Sheets

ROLLER DRIVE UNIT

FIELD OF THE INVENTION

The present invention relates to a roller drive unit for propelling objects on a conveyor track.

DESCRIPTION OF THE PRIOR ART

Roller drive units of this kind are used, for example, to transport items of freight that have been placed on roller-type conveyor tracks. Such items may comprise cargo containers or pallets. A preferred application of the roller drive unit disclosed here is in air freight loading systems, used to transfer cargo containers into the cargo space of an aircraft and stow them for transport. Accordingly, the roller drive unit is installed in the aircraft itself.

When roller drive units of this kind are switched on, the associated rollers are swiveled upward in such a way that they press against the bottom of a cargo container situated above them. This frictional contact enables the torque of the drive rollers to be transmitted to the floor of the cargo container, so that the drive rollers move the container forward.

The intended area of application presents many problems regarding the construction of such roller drive units. Whereas the pressure the drive roller exerts against the floor of the container must be sufficiently high, this pressing force should be "tapped off" from the torque of the motor so that no extra means of raising the drive roller are needed. At the same time, the roller drive unit must have small dimensions and low weight. Because a plurality of such roller drive units are used simultaneously in a conveyor track, their reliability must be particularly great: failure of a single unit can interrupt the loading process.

A roller drive unit of this kind is disclosed in the German Patent Specification DE 41 02 424 A1. In this roller drive unit a drive roller is constructed in one piece and is rotatably mounted on a frame. The drive roller is connected to an electric motor by way of a gear arrangement and can be rotated by this electric motor. The axis of rotation of the drive roller is perpendicular to the axis of rotation of the motor. The gear arrangement takes the form of a planetary gear system with one input and two outputs. The input of the planetary gear system is connected to the motor, the first output to the drive roller, and the second output to a lifting mechanism with which the drive roller can be raised from a lower, resting position into an upper, operating position.

When the drive roller is raised and a cargo container is being transported over the roller, a large load is placed on the lifting mechanism and the driver roller, this makes the roller drive unit liable to damage.

SUMMARY OF THE INVENTION

According to the present invention there is provided a roller drive unit for propelling objects on a conveyor track, comprising a frame defining first and second ends; a drive roller which is mounted to extend substantially across the entire width of the first end of the frame and which is divided to form two drive-roller components; a bearing by means of which the drive roller is rotatably mounted on the first end of the frame; a motor means comprising a rotor and a stator by means of which the drive roller can be rotated about an axis (X) that is disposed perpendicular to an axis of rotation (Y) of the rotor; a lifting mechanism disposed symmetrically about the middle of the drive roller and about the bearing for swivelling the frame about an axis of rotation which is disposed at the second end of the frame and which is parallel with the axis (X) of the drive roller, thereby to raise the drive roller from a lower, resting position into an upper, operating position; and a gear means comprising an input connected to the motor means and two outputs, a first of which is connected to the lifting mechanism in order to power it, and the second of which is connected to and powers the drive roller.

In the invention, as a result of the paired, symmetrical arrangement of the lifting mechanism and the drive roller, the drive roller is held in an especially stable manner. A well-balanced distribution of the load can be achieved, which results in the roller drive unit being very durable. In contrast to an asymmetrical arrangement, the arrangement in the invention has the advantage that when the frame is pivoted to raise the drive roller, only a slight moment of tilt is generated.

Preferably, the lifting mechanism comprises two rotatably mounted cams, each of which is connected to the rotor of the electric motor by way of the gear arrangement. By means of these cams, the drive roller can be raised in a particularly simple manner. A cam disk of this kind is simple to manufacture and therefore contributes to an economical implementation of the lifting mechanism.

The cams are advantageously connected in a torsionally stable manner to the first output of the gear arrangement. As a result, an especially precise and reliable lifting of the drive roller is achieved.

In a further advantageous embodiment of the roller drive unit in accordance with the invention, the lifting mechanism comprises a retraction means that acts on the lifting mechanism so as to retract it into the lower, resting position. This feature ensures that the drive roller is rapidly and reliably returned to its resting position. This retraction means advantageously takes the form of two torsion springs, each of which is respectively associated with one of the cams.

Preferably also, the lifting mechanism exerts a lifting force on the frame in the region of two planes, each of which passes substantially through the middle of one of the drive-roller components and is perpendicular to its axis. This arrangement further improves the load distribution and reduces the moment of tilt that is generated.

The invention will now be described by way of example with reference to the accompanying drawings.

DESCRIPTION OF A PREFERRED EMBODIMENT

Figure 1:
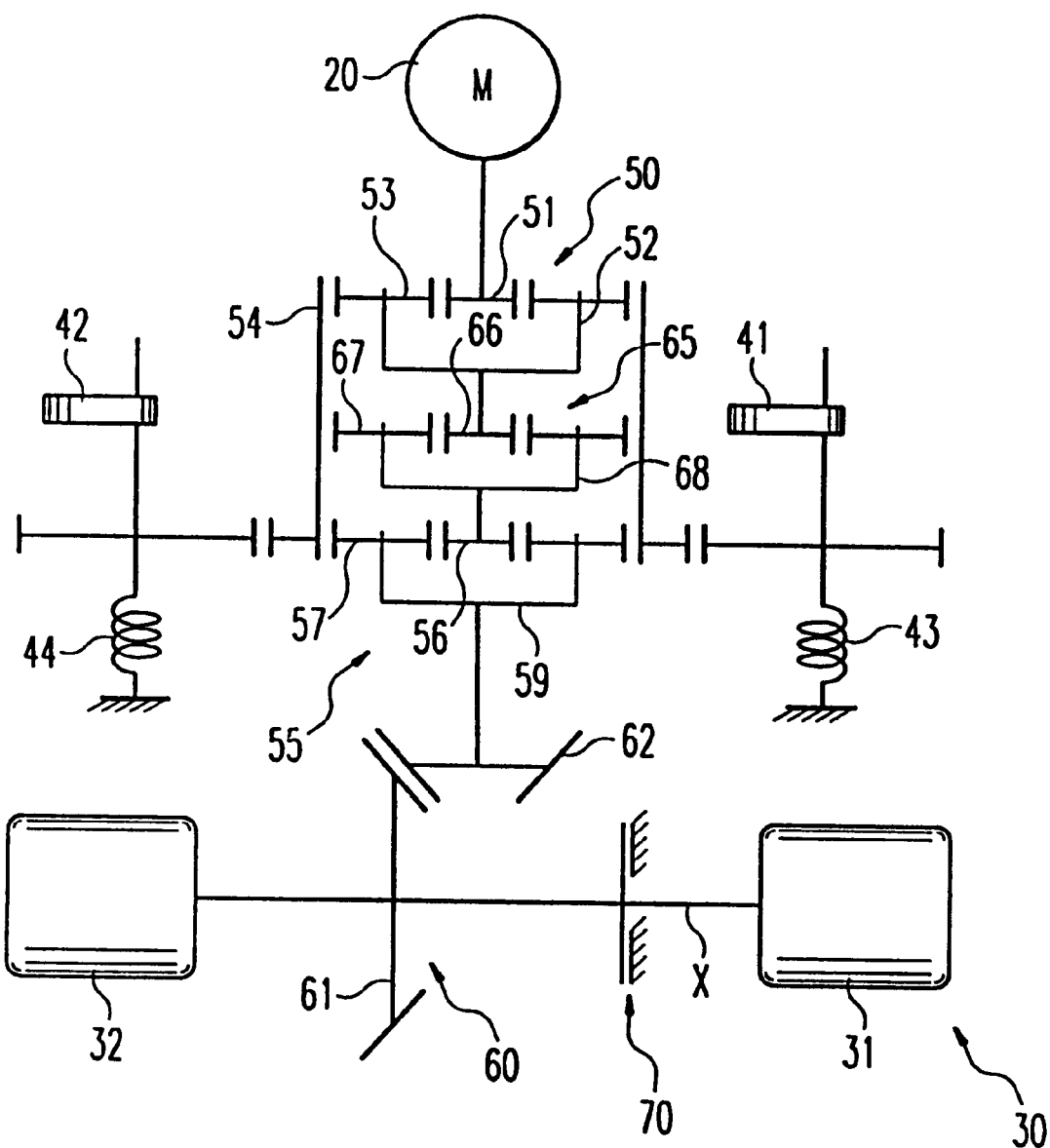
FIG. 1 is a diagram showing schematically the layout of a roller drive unit in accordance with the invention.

FIG. 1 is a diagram showing the layout of an exemplary embodiment of a roller drive unit in accordance with the invention, which serves to transport objects such as cargo containers on a conveyor track in an aircraft.

The roller drive unit comprises an electric motor 20, the drive shaft of which is connected to an input of a main gear unit 50. In this case the main gear unit 50 has a planetary configuration. A sun wheel 51 of the planetary gearing is attached to the drive shaft of the electric motor 20. The sun wheel 51 meshes with the planet wheels 53, which are rotatably mounted on a pinion cage 52 and mesh with a ring gear 54 of the main gear unit 50. The pinion cage 52 is connected to a sun wheel 66 of a first reduction gear unit 65. The sun wheel 66 meshes with the planet wheels 67 of the first reduction gear unit 65. The planet wheels 67 are rotatably mounted on a pinion cage 68. This pinion cage 68 is connected to a sun wheel 56 of a second reduction gear unit 55. The sun wheel 56 meshes with planet wheels 57 of the second reduction gear unit 55, which are rotatably mounted on a pinion cage 59. The pinion cage 59 constitutes a second output of the gear arrangement comprising the main gear unit 50 and the first and second reduction gear units 65 and 55. The ring gears of the first and second reduction gear units 65 and 55 are connected to the ring gear 54 of the main gear unit 50 and constitute a first output of the gear arrangement comprising the main gear unit 50 and the first and second reduction gear units 65 and 55.

The second output 59 of the gear combination comprising the main gear unit 50 and the reduction gear units 65 and 55 is connected to a second bevel wheel 62 of a bevel gearing 60. A first bevel wheel 61 of the bevel gearing 60 is attached to a drive shaft X of a drive roller 30. The axis of rotation of the electric motor 20 is disposed perpendicular to the axis of rotation of the drive roller 30. The bevel gearing 60 is thus required so that torques can be transmitted between the drive roller 30 and motor 20, inasmuch as it creates a 90° angle between the input direction of rotation, that of the gear arrangement, and the output direction of rotation.

The drive shaft X of the drive roller 30 is lightly braked in a manner known per se, by means of a braking mechanism 70.

The drive roller 30 in accordance with the invention is subdivided in the middle to form two drive-roller components 31 and 32. Between these two drive-roller components 31 and 32, the first bevel wheel 61 of the bevel gearing 60 and the braking mechanism 70 are mounted on the drive shaft X of the drive roller 30.

The first output 54 of the gear arrangement, which is formed by the conjoined ring gears, is connected to a lifting mechanism formed by the two lifting-mechanism components 41 and 42. The two lifting-mechanism components 41 and 42 are disposed symmetrically about the middle of the drive roller 30. The two lifting-mechanism components 41 and 42 preferably each comprise a rotatably mounted cam disk, each of which is connected to a rotor of the electric motor 20 by way of a gear wheel that meshes with the ring gears 54 and hence by way of the planetary gear unit 50.

The cam disks of the lifting-mechanism components 41 and 42 serve to raise the drive-roller components 31 and 32 from a lower, resting position into an upper, operating position. In order to ensure that the drive-roller components 31 and 32, when they are in the upper, operating position, can be returned to the resting position, the lifting-mechanism components 41 and 42 comprise retraction devices in the form of torsion springs 43 and 44, respectively.

When the electric motor 20 is turned on, the braking mechanism 70 simultaneously brakes the pinion cage 52. The torque generated by the drive shaft of the motor 20 is transmitted by way of the sun wheel 51 to the planet wheels 53 of the main gear unit 50 and thus to the lifting-mechanism components 41 and 42 connected to the ring gear 54. The result is that rotation of the cam disks of the lifting mechanism 41, 42 raises the drive-roller components 31 and 32 out of their resting position into their upper, operating position. Because of the lifting of the drive-roller components 31 and 32, the retraction springs 43 and 44 are placed under tension with respect to the cam disks 41 and 42. When the cam disks 41 and 42 have abutted against their stops, the movement of the ring gear 54 is arrested. The torque of the motor 20 is now transmitted by way of the pinion cage 52 to the axis of rotation X and thus to the two drive-roller components 31 and 32, which then begin to rotate.

Figure 2:
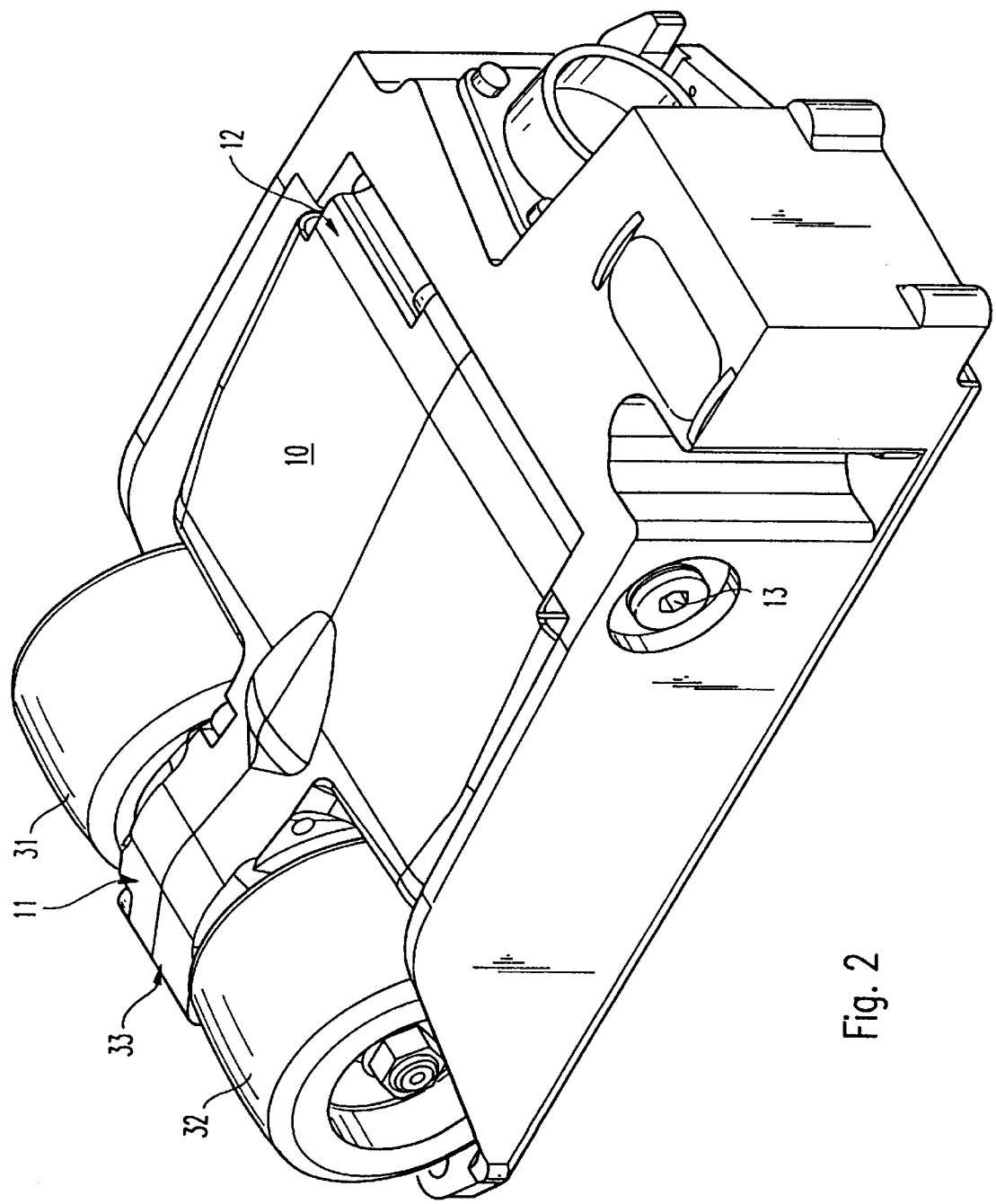
FIG. 2 is a perspective view of the roller drive unit.

FIG. 2 shows a perspective view of the roller drive unit in accordance with the invention described above with reference to the equivalent connection diagram of FIG. 1. The drive roller 30 extends substantially across the entire width of a frame 10 of the roller drive unit. In FIG. 2 are visible the two drive-roller components 31 and 32, which are formed by splitting the drive roller 30 in the middle. The two drive-roller components 31 and 32 are rotatably disposed at a first end 11 of the frame 10, being mounted in the midregion of the drive roller 30 in a bearing 33, which is not visible in FIG. 2. The arrangement is such that the axis of rotation X of the drive roller 30 is parallel to an axis of rotation 13 disposed at the second end 12 of the frame 10. The drive roller 30 with its drive-roller components 31 and 32 is pivoted about this axis of rotation 13 when it is moved upward or downward, between its resting and operating positions. The electric motor, the braking mechanism, the lifting mechanism with its components, the gear arrangements and the retraction springs are disposed within the frame 10. Because the axis of rotation 13 is disposed at the second end 12 of the frame 10, opposite to the drive-roller components 31 and 32, the motor 20 and the gear units 50, 55, 65 and 60 are raised along with the drive-roller components 31 and 32 when the latter are lifted.

Figure 3:
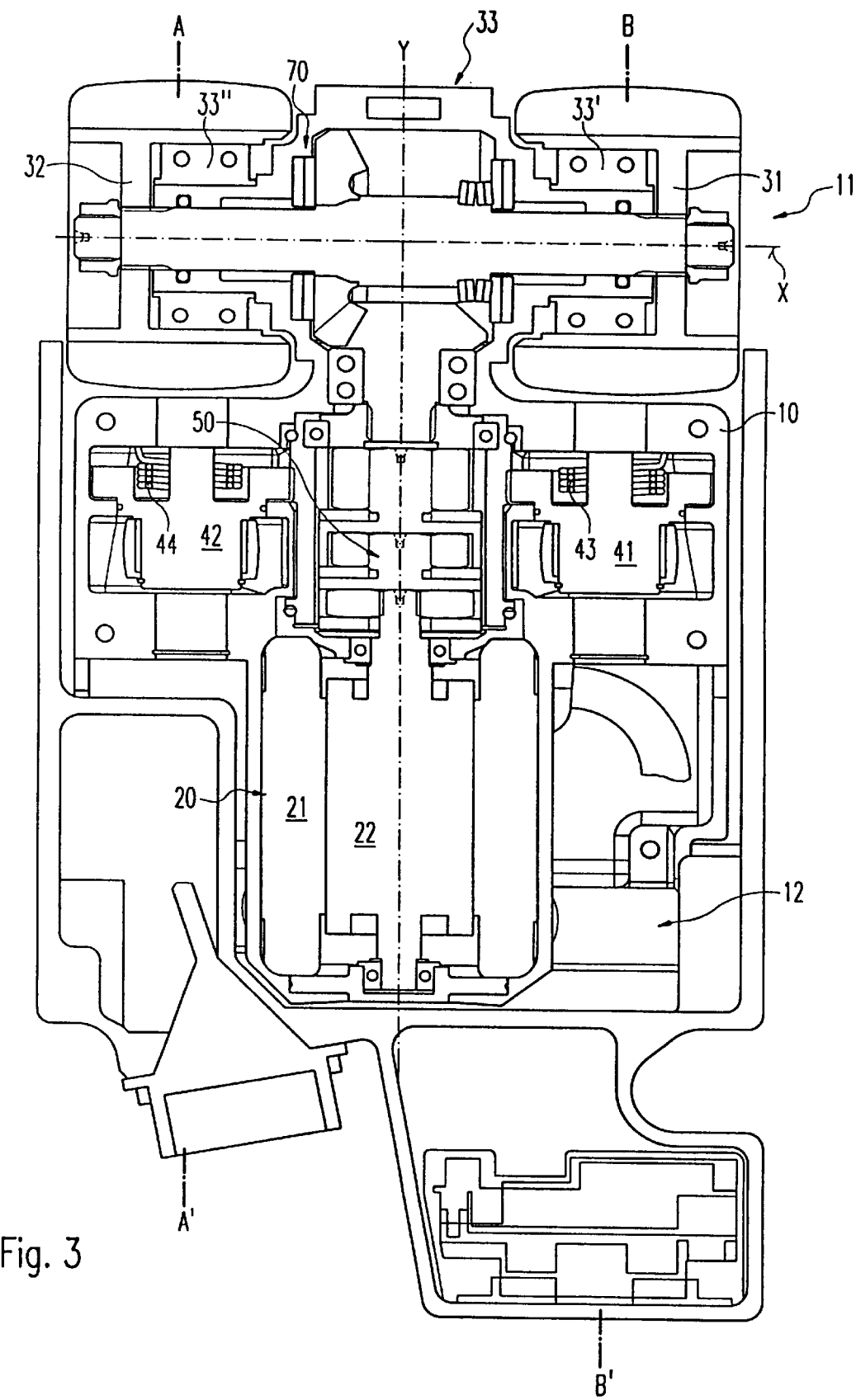
FIG. 3 is a horizontal section through the roller drive unit shown in FIG. 2.

FIG. 3 shows a horizontal section through the roller drive unit shown in FIG. 2. The electric motor 20 is constructed in the usual manner with a rotor 22 and a stator 21, the latter being fixedly mounted in the frame 10. The axis of rotation of the rotor 22 is oriented lengthwise, in the direction in which objects are moved along the conveyor track, and is thus perpendicular to the axis of rotation X of the drive roller 30. The main gear unit 50 is disposed concentrically with respect to the axis of rotation of the rotor 22. This arrangement advantageously makes it possible for the roller drive unit in accordance with the invention to be very compactly constructed. In particular, this construction keeps the width of the roller drive unit small, which is advantageous for employment of the roller drive unit in an aircraft.

It can be seen in FIG. 3 that the drive roller 30 extends substantially across the entire width of the frame 10. FIG. 3 shows further that the two drive-roller components 31 and 32 are mounted rotatably in the frame 10 and symmetrically with respect to the middle of the drive roller 30, in a bearing 33 that is subdivided into a first bearing 33' and a second bearing 33". The two cam disks 41 and 42 of the lifting mechanism in the roller drive unit in accordance with the invention shown in FIG. 3 are disposed symmetrically about the middle of the drive roller 30 and the bearing 33. The two cam disks 41 and 42 in the present exemplary embodiment are situated on the left and right of the gear unit 50. FIG. 3 shows a first plane A–A' and a second plane B–B', each of which passes substantially through the middle of one of the drive-roller components 31 and 32 and is perpendicular to its axis of rotation X. The two cam disks 41 and 42 of the lifting mechanism are so disposed in the first or second plane, A–A' or B–B', that the cam disks 41 and 42 exert a lifting force on the frame 10 substantially in the region of these two planes A–A' and B–B'.

Because of this symmetrical arrangement of the two drive-roller components 31 and 32 and the two cam disks 41 and 42, the load distribution is made particularly suitable and an extremely slight moment of tilt of the roller drive unit is achieved.

What is claimed is:

1. A roller drive unit for propelling objects on a conveyor track, comprising
   a frame defining first and second ends;
   a drive roller which is mounted to extend substantially across the entire width of the first end of the frame and which is divided to form two drive-roller components;
   a bearing by means of which the drive roller is rotatably mounted on the first end of the frame;
   a motor means comprising a rotor and a stator by means of which the drive roller can be rotated about an axis (X) that is disposed perpendicular to an axis of rotation (Y) of the rotor;
   a lifting mechanism disposed symmetrically about the middle of the drive roller and about the bearing for swivelling the frame about an axis of rotation which is disposed at the second end of the frame and which is parallel with the axis (X) of the drive roller, thereby to raise the drive roller from a lower, resting position into an upper, operating position; and
   a gear means comprising an input connected to the motor means and two outputs, a first of which is connected to the lifting mechanism in order to power it, and the second of which is connected to and powers the drive roller.

2. A roller drive unit as claimed in claim 1, wherein the lifting mechanism comprises two rotatably mounted cams each of which is connected to the rotor by way of the gear means.

3. A roller drive unit as claimed in claim 2, wherein the cams are connected in a torsionally stable manner to the first output of the gear means.

4. A roller drive unit as claimed in claim 2, wherein a retraction means is provided which acts on the lifting mechanism to retract it into its lower, resting position.

5. A roller drive unit as claimed in claim 4, wherein the lifting mechanism comprises two torsion springs, each of which is respectively associated with one of the cams.

6. A roller drive unit as claimed in claim 1, wherein the lifting mechanism exerts a lifting force on the frame substantially in the region of two planes (A–A'; B–B'), each of which passes substantially through the middle of one of the drive-roller components and is perpendicular to its rotational axis (X).

* * * * *